(12) United States Patent
Rhee et al.

(10) Patent No.: US 7,965,912 B2
(45) Date of Patent: Jun. 21, 2011

(54) TEMPERATURE INSENSITIVE ARRAYED WAVEGUIDE GRATING MULTIPLEXER FOR OPTICAL PROPERTY COMPENSATION AND THE MANUFACTURING METHOD THEREOF

(75) Inventors: Tae Hyung Rhee, Seongnam (KR); Tae Hun Kim, Yongin (KR); Hyung Jae Lee, Yongin (KR); Byong Gwon You, Yongin (KR)

(73) Assignee: POINTek Inc., Pyungtaek (KR)

( * ) Notice: Subject to any disclaimer, the term of this patent is extended or adjusted under 35 U.S.C. 154(b) by 116 days.

(21) Appl. No.: 12/161,142

(22) PCT Filed: Feb. 27, 2007

(86) PCT No.: PCT/KR2007/001005
§ 371 (c)(1),
(2), (4) Date: Nov. 19, 2008

(87) PCT Pub. No.: WO2007/100205
PCT Pub. Date: Sep. 7, 2007

(65) Prior Publication Data
US 2009/0263075 A1    Oct. 22, 2009

(30) Foreign Application Priority Data
Feb. 28, 2006  (KR) .................. 10-2006-0019240

(51) Int. Cl.
*G02B 6/34* (2006.01)
*G02B 6/12* (2006.01)
(52) U.S. Cl. ........................ 385/37; 385/14
(58) Field of Classification Search ............ 385/14, 385/37
See application file for complete search history.

(56) References Cited

U.S. PATENT DOCUMENTS

| | | | |
|---|---|---|---|
| 6,304,687 B1 | 10/2001 | Inoue et al. | |
| 6,456,763 B2 * | 9/2002 | Kashihara et al. | 385/37 |
| 6,490,395 B1 * | 12/2002 | Nara et al. | 385/39 |
| 6,591,044 B2 * | 7/2003 | Kashihara et al. | 385/51 |
| 6,603,892 B1 | 8/2003 | Ticknor | |
| 7,496,256 B2 * | 2/2009 | Tsuda et al. | 385/37 |
| 7,539,368 B2 * | 5/2009 | Hasegawa et al. | 385/14 |
| 2001/0055444 A1 * | 12/2001 | Kashihara et al. | 385/37 |
| 2002/0085808 A1 * | 7/2002 | Ooyama et al. | 385/37 |
| 2003/0039441 A1 * | 2/2003 | Kashihara et al. | 385/37 |
| 2003/0063858 A1 | 4/2003 | Bulthuis et al. | |
| 2008/0135169 A1 * | 6/2008 | Rhee et al. | 156/256 |

FOREIGN PATENT DOCUMENTS

KR   10-2005-0010076   1/2005
* cited by examiner

*Primary Examiner* — Rhonda S Peace
(74) *Attorney, Agent, or Firm* — The Webb Law Firm

(57) ABSTRACT

Two methods are presented in order to properly compensate the changes of the optical characteristics, which are caused by the optical path length change. First, a path length compensation method in which the additional optical path length, equivalent to the dicing kerf width of the substrate, is added onto the diced-to-be waveguide part of the AWG chip during the waveguide design process and fabrication process so that the compensated optical path length is maintained even after dicing. In addition, a position compensation method is provided in which an additional waveguide is added at the position shifted by a distance equivalent to the kerf width of the substrate such that the additional waveguide undergoes the minimized path length change after dicing is performed.

10 Claims, 5 Drawing Sheets

A) Before Dicing    B) Post Dicing

[Fig. 1]
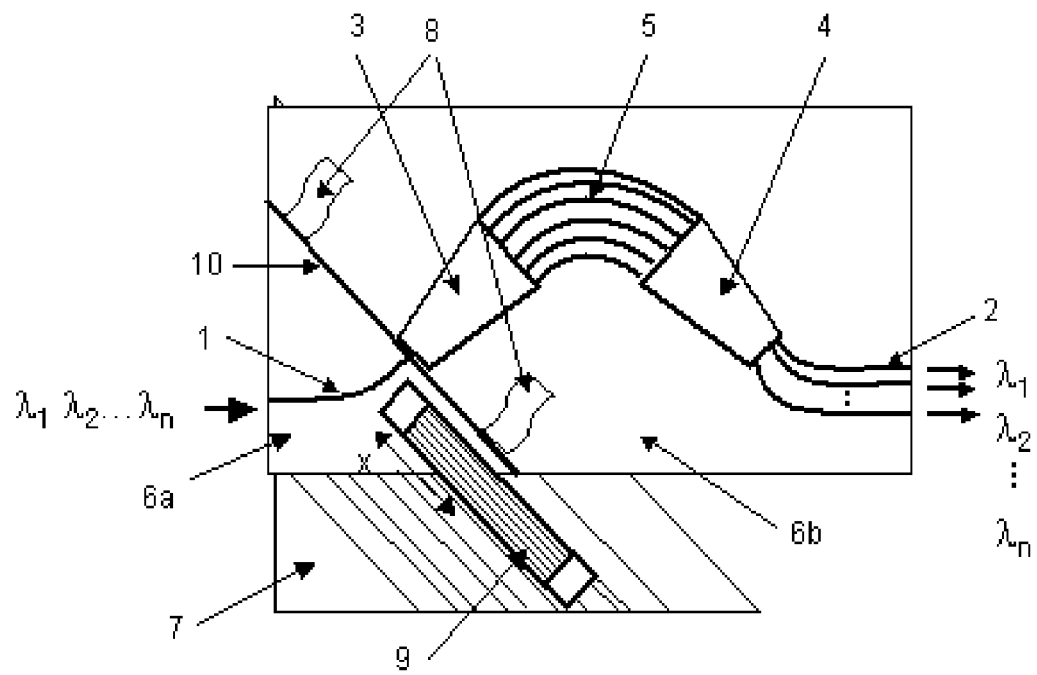
[Fig. 2]
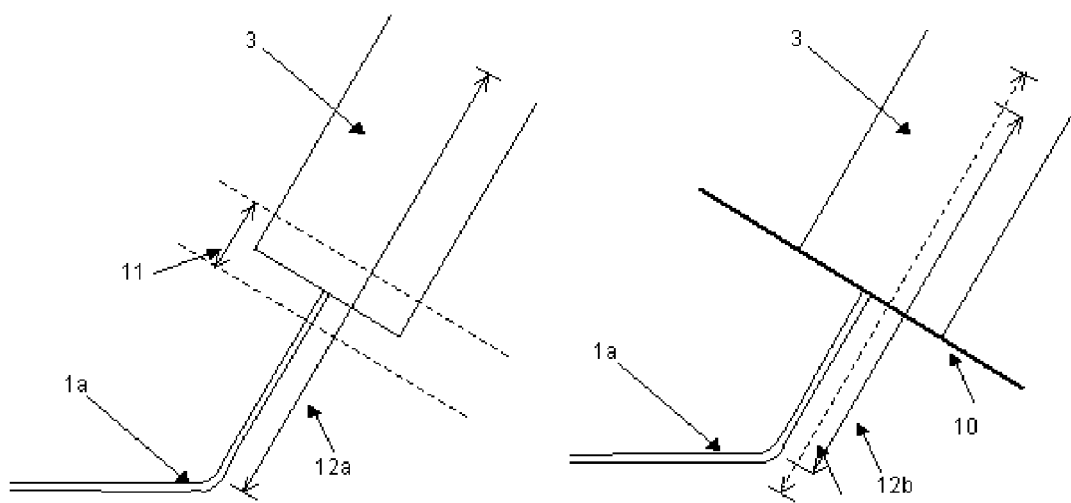
A) Before Dicing
B) Post Dicing

[Fig. 3]
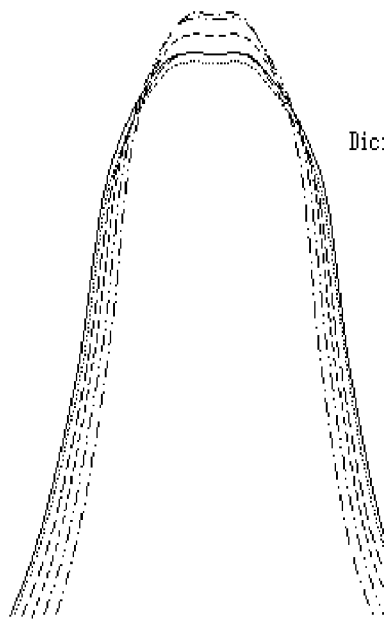
| Dicing Kerf Width(11) | Gap(10) | Optical Path Difference(12) | Insertion Loss | 3dB Bandwidth |
|---|---|---|---|---|
| 0μm | 0μm | 0μm | -3.78dB | 1050pm |
| 150μm | 50μm | 100μm | -5.88dB | 1050pm |
| 150μm | 40μm | 110μm | -5.13dB | 990pm |
| 150μm | 30μm | 120μm | -4.76dB | 960pm |
| 150μm | 20μm | 130μm | -4.20dB | 910pm |
| 150μm | 10μm | 140μm | -4.10dB | 900pm |
[Fig. 4]
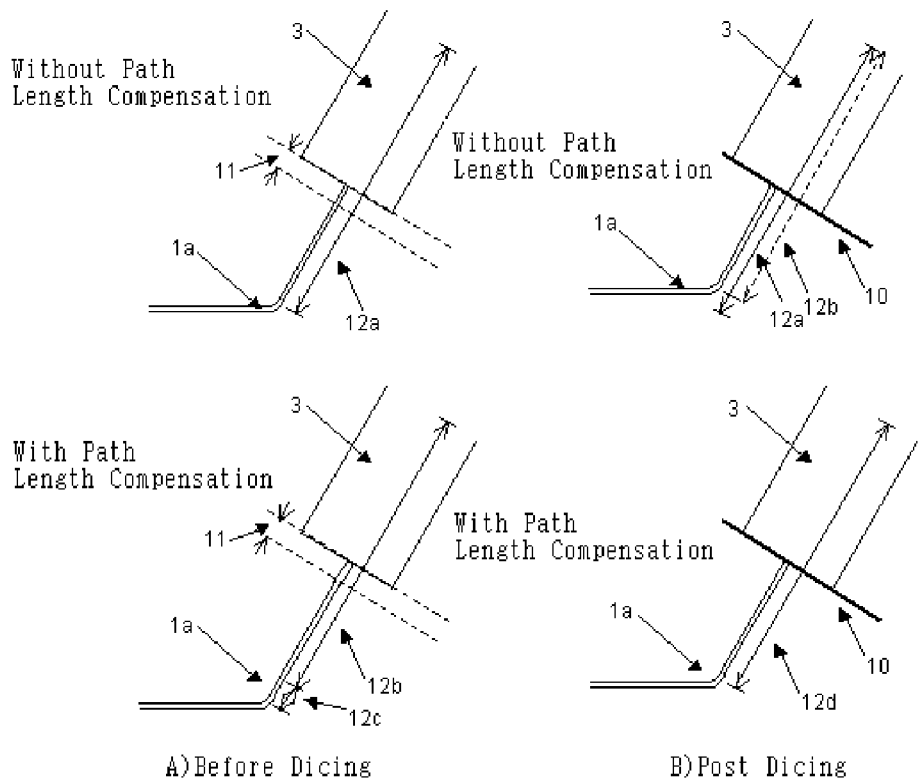
A) Before Dicing  B) Post Dicing

[Fig. 5]
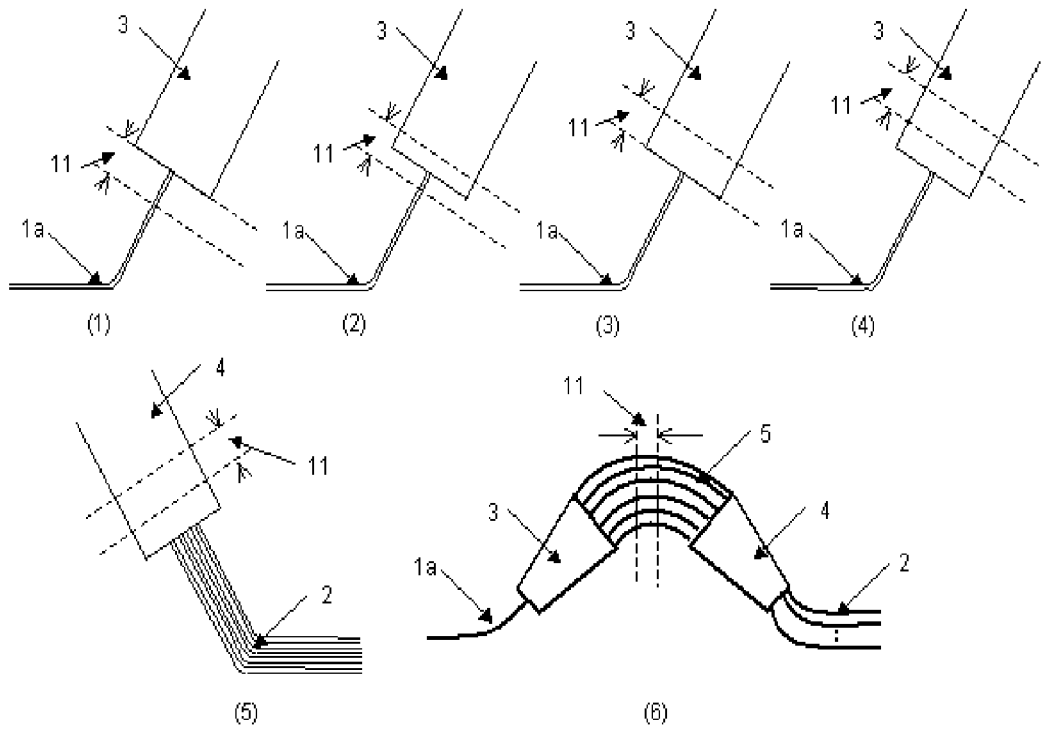
[Fig. 6]
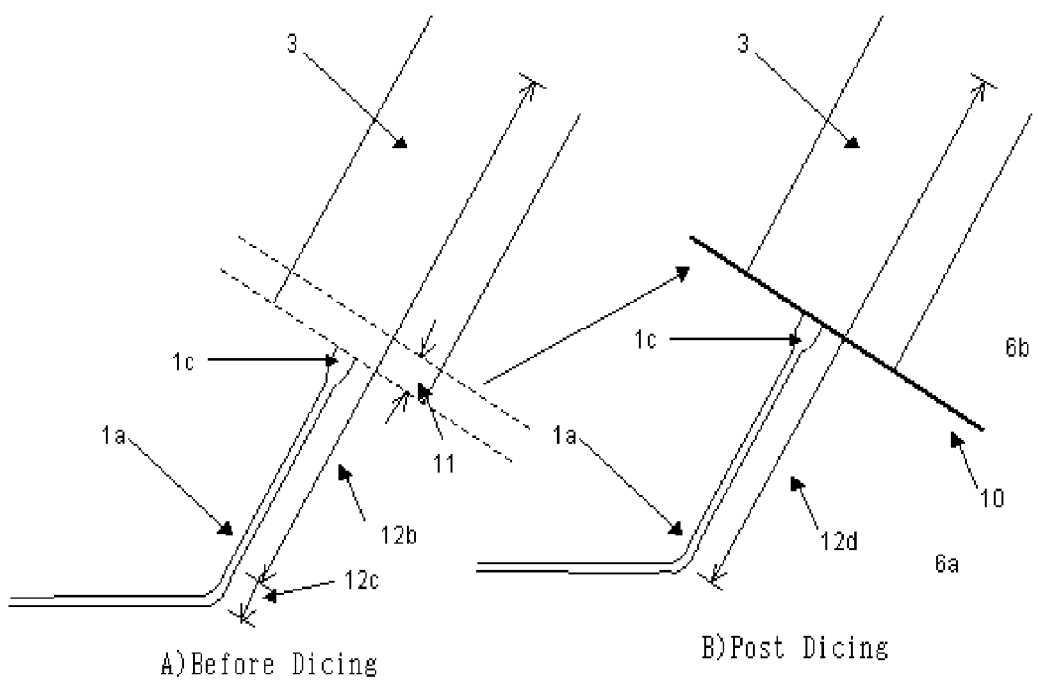

[Fig. 7]
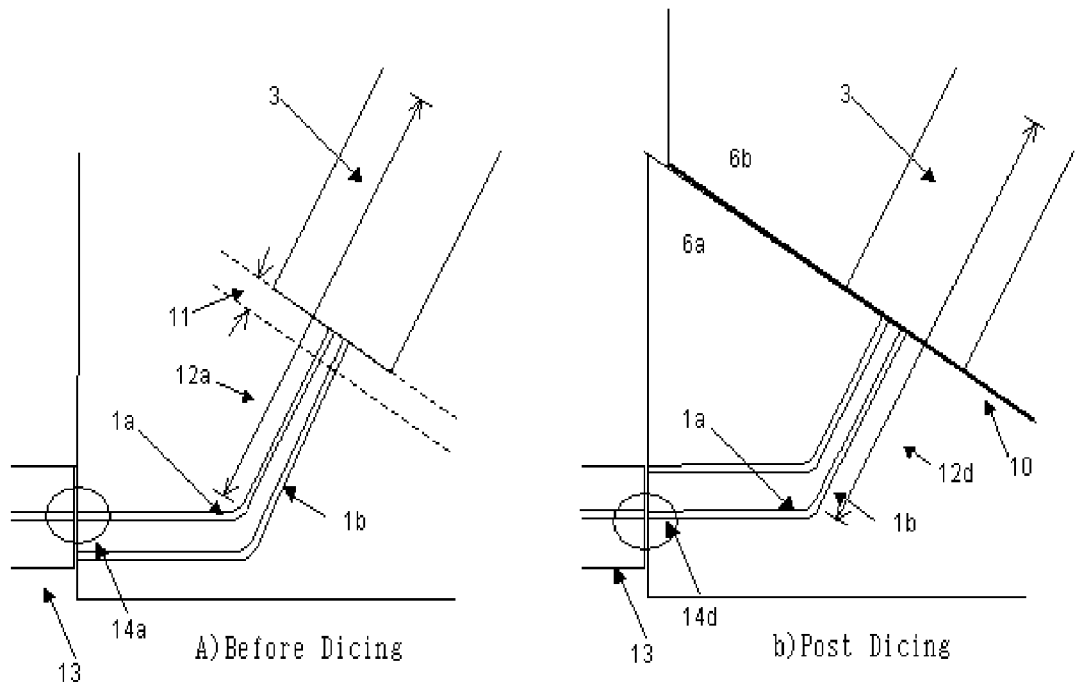
A) Before Dicing   b) Post Dicing
[Fig. 8]
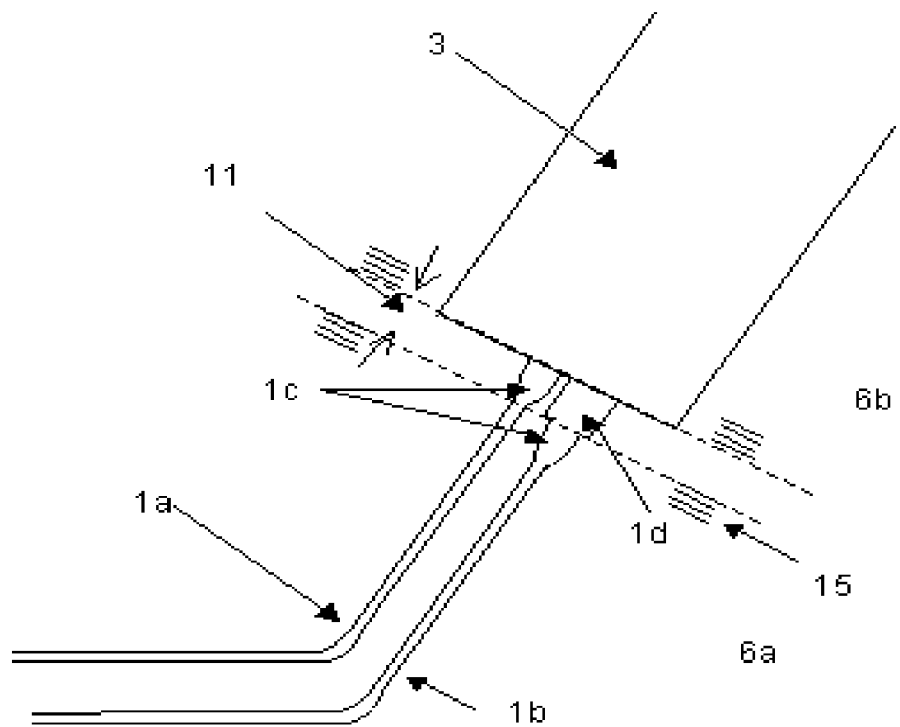

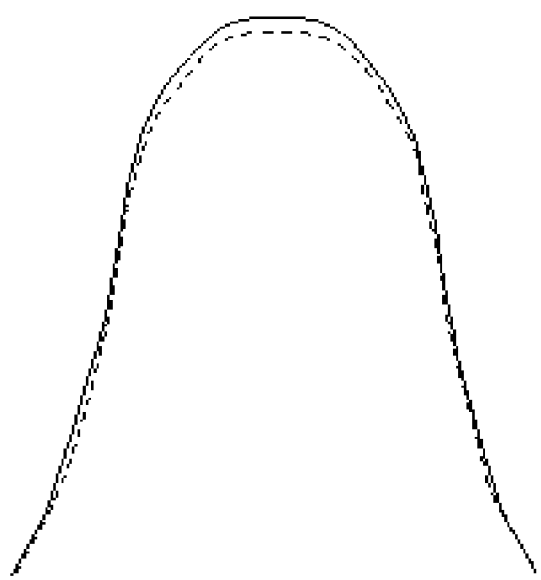
[Fig. 9]
| Dicing Kerf Width(11) | Gap(10) | Optical Path Difference(12) | Insertion Loss | 3dB Bandwidth |
|---|---|---|---|---|
| ——— 0μm | 0μm | 0μm | -3.78dB | 1050pm |
| - - - - 150μm | 10μm | 10μm | -4.10dB | 1040pm |

TEMPERATURE INSENSITIVE ARRAYED WAVEGUIDE GRATING MULTIPLEXER FOR OPTICAL PROPERTY COMPENSATION AND THE MANUFACTURING METHOD THEREOF

BACKGROUND OF THE INVENTION

1. Field of the Invention

WDM telecommunication system, which is frequently used to transmit large bandwidth information, transmits the optical signal with 'N' number of wavelengths simultaneously through a single line of an optical fiber. Since the maximum bandwidth needs to be transmitted on a single optical fiber line in the long haul transmission, DWDM transmission is usually deployed to carry many wavelengths which are separated by optical spacing of 1.0 nm or less. The Arrayed Waveguide Grating multiplexex/demultiplexer (AWG) device is frequently used at the end of receiver units to demultiplex the optical signal with many multiplexed wavelengths.

The conventional AWG requires temperature control using an external electric power source in order to be operational under a certain temperature-maintenance environment. This is because the AWG exhibits wavelength selective sensitivity toward operating temperature changes. Therefore, temperature insensitive AWGs are in an increasing demand at a rapid pace.

2. Description of Related

FIG. 1 represents the schematic illustration of a conventional AWG device. The wavelength multiplexing and demultiplexing characteristics of AWG can be shown from characteristics of the light to focus on specific position with specific wavelength in accordance with a related formula. Thus, the wavelengths of light entering into the output waveguide circuits (2) can be shifted when a position of the initial input stripe waveguide circuit (1a) is moved horizontally (x-direction in FIG. 1). The wavelength at the output stripe waveguide circuits (2) can be changed by dλ when the position of the initial input stripe waveguide circuit (1a) is moved by dx in the horizontal direction (x-direction in FIG. 1) from the center of the focal point of the input slab waveguide (3). This positional relationship is shown in Formula 1, $$dx/d\lambda = [L_f * \Delta L/(n_s * d\lambda_0)] * n_g \quad \text{(Formula 1)}$$

wherein $L_f$ is the focal length of the slab waveguide and $n_g$ is the group refractive index of arrayed waveguides. Formula 2 can be derived from Formula 1 where T is defined as the temperature variation.

$$dx = [L_f * \Delta L/(n_s * d\lambda_0)] * n_g * (d\lambda/dT) * T \quad \text{(Formula 2)}$$

As expressed in Formula 2, the temperature dependency of the wavelength can be compensated when the position of the initial input stripe waveguide circuit (1a) is moved in the horizontal direction (x-direction in FIG. 1) although the wavelength at the output stripe waveguide circuit (2) is shifted upon the temperature variation. For example, the distance of the position movement (dx) of the initial input stripe waveguide circuit (1a) can be calculated to be dx=~0.28T (um) in order to compensate the wavelength shift upon the temperature variation, given where the focal length $L_f$ is 13 mm, the difference of the length in the waveguides among the arrayed waveguides, ΔL is 40 um, the pitch of the waveguide in the arrayed waveguides section at the interface between arrayed waveguides and output slab waveguide d is 14 um, and the diffraction degree, m, is 38. Thus, the wavelength shift at 50° C. temperature variation can be compensated when the input stripe waveguide circuit is moved 14 um in the horizontal direction (x-direction in FIG. 1).

In order to move the position of the initial input stripe waveguide circuit (1a) passively upon the temperature change, it is necessary to move horizontally (x-direction) the position of the initial input stripe waveguide circuit (1a) attached with a lateral sliding rod (9) having larger CTE than substrate; the horizontal movement is effected when the lateral sliding rod (9) undergoes thermal expansion and contraction.

In the schematic illustration of the temperature insensitive AWG as shown in FIG. 1, the followings are drawn functionally: the AWG structure consisting of the two sub-chip parts (an input sub-chip part, 6a; a main sub-chip part, 6b) of AWG chip; the alignment base substrate (7) to re-align and attach these two sub-chip parts (6a, 6b) of AWG chip; the thin films spacers (8) designed to control and to maintain the alignment gap (10) between the two sub-chip parts (6a, 6b); and the lateral sliding rod (9) to compensate the wavelength shift by moving the input sub-chip part (6a), in which the initial input stripe waveguide circuit (1a) is located, in the horizontal (x) direction in accordance with the thermal expansion and thermal contraction. The multiplexed optical wavelengths of light enters from an optical input fiber into the initial input stripe waveguide circuit (1a) on an AWG chip and then those wavelengths are transmitted to the input slab waveguide (3), arrayed waveguides (5), the output stripe waveguide circuits (2) in order, and then finally the demultiplexed wavelengths arrive at the output optical fibers. However, it is inevitable that the optical characteristics undergoes a degree of change as much as the optical path length difference caused by the dicing kerf width (the width removed by dicing blade) of the substrate in the dicing process in spite of temperature insensitive AWG's efficiency. Especially this path length difference due to the dicing kerf width of the AWG chip substrate causes small changes in the bandwidth of the output signal spectra, thereby bringing about optical insertion loss, and changes in other optical characteristics. Although these changes are small, it causes the device failure at the critical point of optical characteristics. Consequently, it is necessary to have a technical solution in order to compensate the changed optical characteristics due to the dicing kerf width of the AWG chip substrate.

The present invention relates to the temperature insensitive AWG device to compensate for the undesired changes of the optical characteristics due to the dicing removal process accompanying the noble temperature insensitive AWG manufacturing process, and the manufacturing method thereof. To illustrate the manufacturing process of the temperature insensitive AWG shown in FIG. 1, the conventional AWG chip was cut at the interface between the initial input stripe waveguide circuit (1a) connected to the input slab waveguide (3) of AWG and the input slap waveguide (3). Then, both sub-chip parts, (6a, 6b) are re-aligned and assembled on the top surface of alignment base substrate (7). The main sub-chip part (6b), which contains the main AWG body of AWG chip, is attached and fixed on the surface of alignment base substrate (7) using an adhesive. In the re-alignment process, the width of the alignment gap (10) between two sub-chip parts (6a, 6b) is easily adjusted by inserting thin film (8) spacers with a certain thickness, in order to maintain the desired gap width. The packaging process for the temperature insensitive AWG is completed by fixing two realigned sub-chip parts (6a, 6b) as these two sub-chip parts (6a, 6b) are connected by a lateral sliding rod (9), which plays an important role to passively maintain the temperature insensitive characteristics.

The conventional cutting method for the temperature insensitive packaging process is to use a dicing saw which is most frequently used in cutting the planar substrate like a silicon wafer. In this cutting or dicing process, an AWG chip substrate is diced by a high-speed spinning dicing blade, and the dicing kerf width of the substrate is determined by the thickness of the dicing blade. The thickness of the dicing blade is chosen by the substrate thickness to be diced, and, in general, it is recommended to use a dicing blade of minimum 100 um-thickness for dicing conventional optical waveguide chip substrate. Therefore, there brings about an inevitable change in the initial optical path length (12a) of the AWG chip; equivalent to the dicing kerf width of the substrate (11), hence, a concomitant change in the optical characteristics of the device takes place.

SUMMARY OF THE INVENTION

FIG. 2 illustrates the optical path length change in the initial optical path length of AWG chip before dicing (12a) and post-dicing (12b) due to the removal of the dicing kerf width (11) of the substrate.

The most sensitive characteristics caused by the optical path length change due to the dicing kerf width (11) of the substrate is the change of the bandwidth, which in turn brings about optical insertion loss and other optical characteristics changes. In the case of the silica-based AWG chip, it is generally observed that the larger the dicing kerf width (11) of the substrate gets, the narrower the bandwidth becomes. FIG. 3 illustrates the change of the bandwidth and optical insertion loss due to the change of the sliced width of the substrate width (11).

In the present invention, two methods are presented in order to properly compensate the changes of the optical characteristics, which are caused by the optical path length change: 1) a path length compensation method in which the additional optical path length (12c), equivalent to the dicing kerf width (11) of the substrate, is added onto the diced-to-be waveguide part of the AWG chip during the waveguide design process and fabrication process so that the compensated optical path length (12d) is maintained even after dicing; and 2) the position compensation method in which an additional waveguide is added at the position shifted by a distance equivalent to the kerf width (11) of the substrate such that the additional waveguide (1b) undergoes the minimized path length change after dicing is performed.

The presented methods in this invention minimize the optical path length change caused by the sliced width of the substrate (11), followed by minimizing the changes of the optical characteristics of the temperature insensitive AWG. Consequently, both optical performance improvement and production yield improvement is achieved in the temperature insensitive AWG simultaneously.

BRIEF DESCRIPTION OF THE DRAWINGS

The subject matter, which is regarded as the invention, is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which FIG. 1 is a schematic illustration of a temperature insensitive AWG;

FIG. 2 is a schematic illustration showing the optical path length change (difference between 12b and 12a) of the temperature insensitive AWG by the dicing kerf width (11) of the substrate in accordance with the present invention;

FIG. 3 is a graphical illustration showing the 3 dB bandwidth changes of the temperature insensitive AWG by various dicing kerf widths (11) of the substrate in accordance with the present invention;

FIG. 4 is a schematic illustration of an example showing the path length compensation method in accordance with the present invention for the compensation of the optical characteristics of the temperature insensitive AWG;

FIG. 5 is a schematic illustration of the examples showing the diced-to-be parts and compensated-to-be parts of the AWG chips when the optical path length compensation method is used in accordance with the present invention;

FIG. 6 is a schematic illustration of an example showing the path length compensation of the dicing kerf width (11) of the substrate in the case of Flat-top type AWG when the optical path length compensation method is used in accordance with the present invention;

FIG. 7 is a schematic illustration of an example showing the position compensation method in accordance with the present invention, which compensates for the change of the optical characteristics of the temperature insensitive AWG;

FIG. 8 is a schematic illustration of an example showing a detailed structure of the additional input stripe waveguide circuit (1b) in the position compensation method in accordance with the present invention; and FIG. 9 is a graphical illustration showing the compensation of the 3 dB bandwidth characteristics of the temperature insensitive AWG in accordance with the present invention.

DETAILED DESCRIPTION OF THE INVENTION

In the present invention, it is necessary for this optical path length compensation method to add the additional optical path length (12c) which is equivalent to the dicing kerf width (11) of the substrate onto the diced-to-be part of the AWG chip at the interface between the initial input stripe waveguide circuit (1a) and input slab waveguide (3). This addition takes place during the photomask design process initially, followed by waveguide fabrication process of the AWG chip. Specifically, the optical path length change is measured by the summation of the length decrement equivalent to the dicing kerf width (11) of the substrate and the length increment equivalent to the alignment gap (10) between the two sub-chip parts (6a, 6b). The final optical path length (12d), $L_F$, is determined by Formula 3 and Formula 4:

$$L_O = L_D + L_K \quad \text{(Formula 3)}$$

$$L_F = L_O L_K + L_G + L_C \quad \text{(Formula 4)}$$

wherein $L_O$ is the originally designed optical path length (12a) before dicing, $L_D$ is the optical path length (12b) after dicing, $L_C$ is the additional optical path length (12c) for the optical path length compensation, $L_G$ is the alignment gap (10) between the two sub-chip parts (6a, 6b) and $L_K$ is the dicing kerf width (11).

The effect of the change of the optical path length upon the changes of the AWG characteristics varies in accordance with the individual sensitivity of the AWG. With the consideration of such sensitivity variation of AWGs, the additional optical path length (12c) for the optical path length compensation is practically achievable at 5%~200% of the $L_P$ where $L_P$ is the path length difference between $L_K$ and $L_G$. For example, $L_C$ is generally determined at 7 um~280 um where $L_K$ is 150 um and $L_G$ is 10 um.

FIG. 4 is a schematic illustration of an example showing the path length compensation method in accordance with the present invention for the compensation of the optical characteristics of the temperature insensitive AWG. As illustrated in FIG. 4, when a part of the initial input stripe waveguide circuit (1a) is diced and removed at the interface between the initial input stripe waveguide circuit (1a) and input slab waveguide (3), the optical path length is compensated by adding the additional path length, $L_C$, at the initial input waveguide circuit part. The part where it is to be removed and compensated, covers not only a part of the initial input stripe waveguide circuit (1a), but also all the related parts, for the temperature insensitive AWG packaging, including a part of input slab waveguide (3), a part of the arrayed waveguides (5), and a part of the output slab waveguide (4). FIG. 5 is a schematic illustration of the examples showing the diced-to-be and compensated-to-be parts of the AWGs when the optical path length compensation method is used in accordance with the present invention.

Moreover, in the case of the Flat-top type AWG, it must have a special waveguide structure in order to provide Flat-top operation function to an AWG. This Flat-top operation function waveguide structure (1c) is a parabolic shape or Y-branch shape with a path length of several hundred um, and it is formed at the end of the initial input stripe waveguide circuit (1a) to the input slab waveguide (3). In order to take effective Flat-top operation in the AWG, this Flat-top operation function waveguide structure (1c) must be remained at the end of the initial input stripe waveguide circuit (1a) after dicing the AWG chip. FIG. 6 is a schematic illustration of an example showing the compensation of dicing kerf width (11) in case of Flat-top type AWG when the optical path length compensation method is used, in accordance with the present invention.

The diced part, shown in FIG. 6, is a part of the input slab waveguide (3), not a part of the initial input strip waveguide (1a). More specifically, this diced part is at the beginning part of the input slab waveguide (3) when it is linked from parabolic Flat-top operation function waveguide structure (1c) of the initial input stripe waveguide (1a), and the remaining part after dicing must contain the additional length of the input slab waveguide (3) in order to maintain the necessary optical path length after dicing. After dicing the AWG chip, it is divided into the two distinctive parts: the part of initial input waveguide circuit (1a) with the parabolic Flat-top operation function waveguide structure (1c), and the part of the input slab waveguide (3). In addition, as previously illustrated in FIG. 5, the part which is to be removed and compensated covers not only a part of the initial input stripe waveguide circuit (1a) but also all the related parts, for the temperature insensitive AWG packaging, including a part of input slab waveguide (3), a part of the arrayed waveguides (5), and a part of the output slab waveguide (4).

The position compensation method is the more effective method than optical path length compensation method when it is difficult to have the accurate estimation of the optical characteristics before dicing the AWG chip. Whereas the optical path length compensation method adds the additional path length equivalent to the dicing kerf width (11) of the substrate at the dicing part, the additional waveguide is added at the position shifted by a distance of the dicing kerf width (11) of the substrate in the position compensation method, and then the additional input stripe waveguide circuit (1b) undergoing the minimized path length change after dicing is used for the optical path alignment. The initial input stripe waveguide circuit (1a) is used for the inspection of the AWG chip characteristics, and for the attachment of the output fibers or fiber arrays to the output waveguide circuits (2) of the AWG chip before it is diced. Then, an input fiber or input fiber array (13) is shifted from the initial input stripe waveguide circuit (1a) to the additional input stripe waveguide circuit (1b) in order to compensate the change from the dicing kerf width (11) of the substrate, and the input fiber or input fiber array (13) is attached. Finally the AWG chip is diced and the diced sub-chip parts (6a, 6b) are re-aligned.

FIG. 7 is a schematic illustration of an example showing the position compensation method in accordance with the present invention, in order to compensate for the change of the optical characteristics of the temperature insensitive AWG. In this figure, the position shift from the initial alignment position (14a) between the input fiber array (13) and the initial input stripe waveguide circuit (1a) before dicing to the final alignment position (14b) between input fiber array (13) and the additional input stripe waveguide circuit (1b) after dicing is also illustrated. In addition, it is not necessary to have the optical alignment to the initial input stripe waveguide circuit (1a) prior to the optical alignment to the additional stripe input waveguide circuit (1b).

FIG. 8 is a schematic illustration of an example showing a detailed structure of the additional input stripe waveguide (1b) in the position compensation method in accordance with the present invention. As shown in FIG. 8, it is useful to have a dummy waveguide (1d) whose width is greater than the width of the additional input stripe waveguide (1b), at the part to be diced between the additional input waveguide (1b) and the input slab waveguide (3) for the input fiber or input fiber array attachment later. In addition, the dummy waveguide (1d) is formed at the interface between the parabolic Flat-top operation function waveguide structure (1c) at the end of the additional input stripe waveguide (1b) and the input slab waveguide (3). The significant portion of this dummy waveguide (1d) needs to be removed during the dicing process. Such a removal can effectively be carried out during the dicing process when a ruler (15) is used to indicate the dicing angle and dicing position precisely. These rulers (15) are manufactured at the same time when the waveguides are fabricated. In addition, as previously illustrated in FIG. 5, the part that needs to be removed and compensated covers not only a part of the input waveguide circuit, but also all the related parts, for the temperature insensitive AWG packaging, including a part of input slab waveguide (3), a part of the arrayed waveguides (5), and a part of the output slab waveguide (4).

FIG. 9 is a graphical illustration showing the compensation of the 3 dB bandwidth characteristics of the temperature insensitive AWG in accordance with the present invention. The examples for manufacturing temperature insensitive AWGs to compensate the change of the optical characteristics which take place during the manufacturing process of temperature insensitive AWG are shown. Regarding to a manufacturing example for the compensation of the change of optical characteristics in accordance with the path length compensation to a Flat-top type temperature insensitive AWG especially, the very beginning part of the input slab waveguide (3), which is linked with the Y-branch type Flat-top operation function waveguide structure (1c) at the end of the initial input stripe waveguide circuit (1a) in an AWG chip, is pre-determined to be diced. The thickness of the dicing blade is 120 um and the film (8) spacer thickness for the alignment gap (10) between two sub-chip parts (6a, 6b) is to be 10 um. With the 5%-200% estimation of the compensation length based on 110 um, the compensation length of 100 um is determined based on the thermal characteristics of the AWG chip. Therefore, the length of the input slab waveguide (3) is adjusted to increase by additional 100 um in the AWG chip design stage, and the photomask is prepared in accordance with the additional input slab length. The AWG chips are fabricated on the silicon wafer using semiconductor fabrication processes such as film deposition, photolithography and reactive ion etching. Then, the AWG chips are separated individually from the processed wafer, and the facets of these individual AWG chips are polished.

After an input fiber array and an output fiber array are aligned and attached to the respective input and output facets of an AWG chip, the AWG chip is diced by a dicing saw equipped with 120 um blade thickness. In this dicing process, the pre-determined beginning part of the input slab waveguide (3) is diced and 120 um-length from the input slab waveguide (3) length is removed as a dicing kerf width (11). The diced two sub-chip parts (6a, 6b) are re-aligned by inserting 10 um-thickness film (11) spacers between the two sub-chip parts (6a, 6b) on the alignment bans substrate (7). Therefore, the total change of the optical path length including the alignment gap (10) is 10 um. Finally, the temperature insensitive AWG is completed by the assembly as illustrated in FIG. 1.

Regarding to a manufacturing example for the compensation of the change of optical characteristics in accordance with the position compensation, it is predetermined to add a dummy waveguide (1d) at the interface between the input slab waveguide (3) and Y-branch type Flat-top operation function waveguide structure (1c) at the end of the initial input stripe waveguide circuit (1a) in an AWG chip; also predetermined is to dice the AWG chip at the dummy waveguide (1d). The thickness of the dicing blade is 120 um and the film (8) thickness for the re-alignment gap (10) between two sub-chip parts (6a, 6b) is to be 10 um. With the 5%-200% estimation of the compensation length based on 110 um, the compensation length of 100 um is determined based on the thermal characteristics of the AWG chip. Therefore, the additional input stripe waveguide circuit (1b) with the dummy waveguide (1d) at its end is added at the photmask design stage, together with the initial input stripe waveguide circuit (1a). The dummy waveguide (1d) has the width of 300 um and the length of 115 um at the photomask design stage. The AWG chips are fabricated on the silicon wafer using semiconductor fabrication processes such as film deposition, photolithography and reactive ion etching. Then, individual AWG chips are separated from the processed wafer, and the facets of these individual AWG chips are polished. After an input fiber array and an output fiber array are aligned to the initial input stripe waveguide circuit (1a) and the output stripe waveguide circuits (2) of the AWG chip, the optical characteristics of the AWG chip is inspected, and then the input fiber array is shifted from the position of the initial input stripe waveguide circuit (1a) to the position of the additional input waveguide circuit (1b). After an input fiber array and an output fiber array are aligned and attached to the additional input waveguide circuit (1b) and the output stripe waveguide circuits (2), the AWG chip is diced at the dummy waveguide (1d) part by using a dicing saw equipped with 120 um blade thickness. In this dicing process, the beginning part of the input slab waveguide (3) is removed by 5 um-length together with the dummy waveguide (1d). The diced two sub-chip parts (6a, 6b) are re-aligned by using the additional input stripe waveguide circuit (1b) on the alignment base substrate (7) and the 10 um-thickness film (11) spacers are inserted between the two sub-chip parts (6a, 6b). Therefore, the total change of the optical path length including the alignment gap (10) is 5 um. Finally, the temperature insensitive AWG is completed by the assembly as illustrated in FIG. 1.

In the present examples explained above, the Flat-top operation function waveguide structure (1c) must be always located in the input sub-chip part (6a) containing the input stripe waveguide circuit (1a or 1b), and, moreover, the Flat-top operation function waveguide structure (1c) must be always located either between the input stripe waveguide circuit (1a or 1b) and the diced facet, between the input stripe waveguide circuits (1a or 1b) and the diced part of the input slab waveguide (3), or between the input stripe waveguide circuit (1a or 1b) and the not-diced input slab waveguide (3).

It is inevitably necessary during the dicing process to remove a certain part of the temperature insensitive AWG chip: equivalent to the thickness of the dicing blade, and this undesired removal process brings about the change of the optical characteristics, especially 3 dB bandwidth, of the temperature insensitive AWG. In the present invention, the two methods are presented in order to easily compensate the changes of the optical characteristics, caused by the optical path length change: 1) the path length compensation method in which the additional optical path length (12c) equivalent to the dicing kerf width (11) of the substrate is added onto the diced-to-be part of the AWG chip during the waveguide design process and fabrication process, to endure that the compensated optical path length (12d) is maintained after dicing; and 2) the position compensation method in which the additional waveguide is added at the position shifted by a distance of the dicing kerf width (11) of the substrate, prior to using the additional input stripe waveguide circuit (1b) that undergoes the minimized path length change after dicing.

The invention claimed is:

1. A method of manufacturing a temperature insensitive Arrayed Waveguide Grating device in order to compensate for optical characteristics changes that result from a decrement of an optical path length by a diced width of a substrate when an optical path of an Arrayed Waveguide Grating chip is diced, the method comprising the following steps:
   designing a photomask for the Arrayed Waveguide Grating chip in which a waveguide part with an additional optical path length is added onto the Arrayed Waveguide Grating chip to be diced;
   preparing the Arrayed Waveguide Grating chip on a planar substrate in which the waveguide part with the additional optical path length is added onto the Arrayed Waveguide Grating chip to be diced;
   dicing an optical path of the Arrayed Waveguide Grating chip to separate the Arrayed Waveguide Grating chip into distinctive parts, and removing the optical path length which is equivalent to a dicing kerf width of the substrate; and
   mechanically re-aligning the optical path of the Arrayed Waveguide Grating chip, wherein the dicing is dicing a part in an input waveguide of the Arrayed Waveguide Grating chip, dicing a part in an input slab waveguide of the Arrayed Waveguide Grating chip, or dicing a part in an interface between an input stripe waveguide circuit and the input slab waveguide of the Arrayed Waveguide Grating chip.

2. The method of manufacturing a temperature insensitive Arrayed Waveguide Grating device of claim 1, further comprising the following step:
   adding the additional optical path length which is determined by 5%-200% of a resultant length, and the resultant length is a length difference between the dicing kerf width of the substrate and the gap between two aligned sub-chip parts.

3. A method of manufacturing a temperature insensitive Arrayed Waveguide Grating device in order to compensate for optical characteristics changes that result from a decrement of an optical path length by a diced width of a substrate when an optical path of an Arrayed Waveguide Grating chip is diced, the method comprising the following steps:

designing a photomask for the Arrayed Waveguide Grating chip in which a waveguide part including an additional input stripe waveguide circuit is added at a position shifted by a certain distance equivalent to a dicing kerf width from an initial waveguide part including an initial input stripe waveguide circuit, the initial waveguide part is to be diced;

preparing the Arrayed Waveguide Grating chip on a planar substrate in which the waveguide part including the additional input stripe waveguide circuit is added at the position shifted by the distance equivalent to the dicing kerf width from the initial waveguide part including the initial input stripe waveguide circuit, the initial waveguide part is to be diced;

dicing an optical path of the Arrayed Waveguide Grating chip to separate the Arrayed Waveguide Grating chip into distinctive parts; and mechanically re-aligning the optical path of the Arrayed Waveguide Grating chip by using the additional input stripe waveguide circuit whose position is shifted by a certain distance equivalent to the dicing kerf width from the initial waveguide part, wherein the dicing is dicing a part in an input waveguide of the Arrayed Waveguide Grating chip, dicing a part in an input slab waveguide of the Arrayed Waveguide Grating chip, or dicing a part in an interface between an input stripe waveguide circuit and the input slab waveguide of the Arrayed Waveguide Grating chip.

4. The method of manufacturing a temperature insensitive Arrayed Waveguide Grating device of claim 3, further comprising the following steps:

locating a Flat-top operation function waveguide structure in an input sub-chip part including an input stripe waveguide circuit when the Arrayed Waveguide Grating chip is diced; and re-aligning an optical path of the Arrayed Waveguide Grating chip by using the input sub-chip part including the input stripe waveguide circuit with the Flat-top operation function waveguide structure.

5. The method of manufacturing a temperature insensitive Arrayed Waveguide Grating device of claim 3, further comprising the following step:

attaching at least one of output fibers and an output fiber array to at least one output stripe waveguide circuit before dicing the Arrayed Waveguide Grating chip.

6. The method of manufacturing a temperature insensitive Arrayed Waveguide Grating device of claim 3, further comprising the following steps:

inspecting optical characteristics of the Arrayed Waveguide Grating chip by using the initial input stripe waveguide circuit before dicing the Arrayed Waveguide Grating chip; and aligning and attaching input fibers or an input fiber array to the additional input stripe waveguide circuit and output stripe waveguide circuits by shifting from a position of the initial input stripe waveguide circuit.

7. The method of manufacturing a temperature insensitive Arrayed Waveguide Grating device of claim 3, further comprising the following steps:

adding a dummy waveguide at the initial waveguide part to be diced and between the input stripe waveguide circuit and an input slab waveguide; and removing at least a part of the dummy waveguide.

8. A temperature insensitive Arrayed Waveguide Grating device which compensates optical characteristic changes resulting from a decrement of an optical path length by a dicing kerf width of a substrate when an optical path of an Arrayed Waveguide Grating chip is diced, the temperature insensitive Arrayed Waveguide Grating device comprising:

a Flat-top operation function waveguide structure which is located in an input sub-chip part including an input stripe waveguide circuit of the Arrayed Waveguide Grating chip after the Arrayed Waveguide Grating chip has been diced to separate the Arrayed Waveguide Grating chip into distinctive parts, and after mechanical re-alignment of the optical path of a first sub-chip part and a second sub-chip part of the distinctive parts, wherein the Arrayed Waveguide Grating chip has a waveguide part with an additional optical path length which is added onto the Arrayed Waveguide Grating chip to be diced for compensating the optical characteristic changes, wherein the dicing kerf width is made by dicing a part in an input waveguide of the Arrayed Waveguide Grating chip, dicing a part in an input slab waveguide of the Arrayed Waveguide Grating chip, or dicing a part in an interface between an input stripe waveguide circuit and the input slab waveguide of the Arrayed Waveguide Grating chip.

9. The temperature insensitive Arrayed Waveguide Grating device of claim 8, wherein the Flat-top operation function waveguide structure in the input sub-chip part comprises one of the following:

a Flat-top operation function waveguide structure located between an input stripe waveguide circuit and a diced facet;

a Flat-top operation function waveguide structure located between the input stripe waveguide circuit and a diced part of an input slab waveguide; or a Flat-top operation function waveguide structure located between the input stripe waveguide circuit and a not-diced input slab waveguide.

10. A temperature insensitive Arrayed Waveguide Grating device in order to compensate for optical characteristics changes that result from a decrement of an optical path length by a diced width when an optical path of an Arrayed Waveguide Grating chip is diced to separate the Arrayed Waveguide Grating chip into distinctive parts and then the optical path is re-aligned, the temperature insensitive Arrayed Waveguide Grating device comprising:

an additional input stripe waveguide circuit;

a dummy waveguide which is located at the end of the additional input stripe waveguide circuit; and a Flat-top operation function waveguide structure located between the input stripe waveguide circuit and the dummy waveguide, which is to be removed by a dicing kerf during the dicing process, before dicing the Arrayed Waveguide Grating chip, wherein the additional input stripe waveguide circuit is added at a position shifted by a certain distance equivalent to a dicing kerf width from an initial waveguide part including an initial input stripe waveguide circuit and the initial waveguide part is to be diced for compensating the optical characteristic changes, wherein the dicing kerf width is made by dicing a part in an input waveguide of the Arrayed Waveguide Grating chip, dicing a part in an input slab waveguide of the Arrayed Waveguide Grating chip, or dicing a part in an interface between an input stripe waveguide circuit and the input slab waveguide of the Arrayed Waveguide Grating chip.

* * * * *